(12) United States Patent
Al-Sulaiman et al.

(10) Patent No.: US 7,540,110 B2
(45) Date of Patent: Jun. 2, 2009

(54) SYSTEM FOR DELIVERY OF INSECTICIDE

(75) Inventors: Faleh A. Al-Sulaiman, Dhahran (SA);
Muhammad A. Hawwa, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 207 days.

(21) Appl. No.: 11/822,383

(22) Filed: Jul. 5, 2007

(65) Prior Publication Data

US 2009/0007481 A1 Jan. 8, 2009

(51) Int. Cl.
*A01M 1/20* (2006.01)
*A01M 7/00* (2006.01)

(52) U.S. Cl. .................. 43/108; 43/132.1; 47/57.5; 47/32.4; 47/1.5; 47/40.5; 239/273; 239/275

(58) Field of Classification Search .................. 43/108, 43/132.1, 900, 124; 47/57.5, 32.4, 1.5, 21.1, 47/40.5, 48.5, 1.01 R; 239/273, 275, 276, 239/279, 127; 118/50; 427/291
See application file for complete search history.

(56) References Cited

U.S. PATENT DOCUMENTS

| | | | | |
|---|---|---|---|---|
| 44,238 A | * | 9/1864 | Towne ........................ | 43/108 |
| 46,298 A | * | 2/1865 | Hilton ........................ | 43/108 |
| 48,838 A | * | 7/1865 | Ring ........................ | 43/108 |
| 60,951 A | * | 1/1867 | Ring ........................ | 43/108 |
| 70,349 A | * | 10/1867 | Mendenhall .................. | 43/108 |
| 129,972 A | * | 7/1872 | Ludlum ........................ | 47/73 |
| 179,297 A | * | 6/1876 | Grader ........................ | 43/108 |
| 228,393 A | * | 6/1880 | Richards ........................ | 43/108 |
| 280,637 A | * | 7/1883 | Lensing ........................ | 47/32.4 |
| 293,463 A | * | 2/1884 | Hogeboom .................. | 43/108 |
| 313,424 A | * | 3/1885 | Hughes ........................ | 47/32 |
| 322,523 A | * | 7/1885 | Cook ........................ | 43/108 |
| 402,722 A | * | 5/1889 | Cook ........................ | 47/73 |
| 447,668 A | * | 3/1891 | Duryee ........................ | 47/57.5 |
| 452,513 A | * | 5/1891 | Batter ........................ | 43/132.1 |
| 523,682 A | * | 7/1894 | Noone ........................ | 43/108 |
| 529,643 A | * | 11/1894 | Carlson ........................ | 43/108 |
| 561,391 A | * | 6/1896 | Greene ........................ | 43/132.1 |
| 574,998 A | * | 1/1897 | Kent et al. .................. | 47/32.4 |

(Continued)

FOREIGN PATENT DOCUMENTS

DE 19741956 A1 * 3/1998

(Continued)

*Primary Examiner*—Darren W Ark
(74) *Attorney, Agent, or Firm*—Richard C. Litman

(57) ABSTRACT

The system for delivery of insecticide provides a portable enclosure for delivering insecticide to an infested tree trunk. The system includes an annular shell disposed around with the trunk of the tree that defines an annular tank. An annular base supports the wall(s) of the annular shell and has a liquid impermeable membrane attached thereto that can be wrapped around the base of the tree trunk to prevent pesticide seepage into the ground. A pump delivers insecticide into the annular tank at an upper end of the tank. A drain hose attached to the base of the tank returns insecticide to the pump for recirculation. The pump is actuated in pulsating mode to agitate insecticide in the tank, causing waves of sufficient pressure to induce the insecticide to penetrate deeply through any bores in the trunk to kill both adult insects and larvae.

10 Claims, 7 Drawing Sheets

U.S. PATENT DOCUMENTS

| | | | | |
|---|---|---|---|---|
| 694,208 | A | * | 2/1902 | Smith .......................... 43/108 |
| 730,575 | A | * | 6/1903 | Schirra ........................ 43/108 |
| 735,019 | A | * | 7/1903 | Pfister ......................... 118/50 |
| 770,461 | A | * | 9/1904 | Haggerty ..................... 47/32.4 |
| 784,684 | A | * | 3/1905 | Karlsen ........................ 43/108 |
| 818,678 | A | * | 4/1906 | Garrison ...................... 43/108 |
| 916,106 | A | * | 3/1909 | Clark ........................... 43/108 |
| 933,483 | A | * | 9/1909 | Mohr ........................... 43/108 |
| 933,654 | A | * | 9/1909 | Lippincott ................... 47/32.4 |
| 983,114 | A | * | 1/1911 | Barry ........................... 43/108 |
| 989,325 | A | * | 4/1911 | Bremer ........................ 43/108 |
| 1,039,018 | A | * | 9/1912 | Bouska ......................... 43/108 |
| 1,043,060 | A | * | 11/1912 | Born ............................ 118/50 |
| 1,043,431 | A | * | 11/1912 | Huffmaster .................. 43/108 |
| 1,235,520 | A | * | 7/1917 | Kirfman ...................... 47/32.4 |
| 1,323,891 | A | * | 12/1919 | Marsico ....................... 43/108 |
| 1,358,130 | A | * | 11/1920 | Wheeler ....................... 118/50 |
| 1,366,616 | A | * | 1/1921 | Wheeler ....................... 118/50 |
| 1,398,212 | A | * | 11/1921 | Wheeler ....................... 118/50 |
| 1,415,134 | A | * | 5/1922 | Williams ...................... 43/108 |
| 1,513,138 | A | * | 10/1924 | Tarnok ......................... 43/124 |
| 1,562,729 | A | * | 11/1925 | Anderson ..................... 43/108 |
| 1,579,534 | A | * | 4/1926 | Hibbard et al. ............... 43/108 |
| 1,756,453 | A | * | 4/1930 | Davey et al. ................. 47/57.5 |
| 1,774,019 | A | * | 8/1930 | Lam .............................. 47/73 |
| 1,834,084 | A | * | 12/1931 | Barnes ......................... 47/23.2 |
| 1,863,672 | A | * | 6/1932 | Repp ............................ 43/108 |
| 1,954,795 | A | * | 4/1934 | Bernitz, Sr. .................. 43/108 |
| 1,982,975 | A | * | 12/1934 | Aiken ........................... 43/124 |
| 2,007,879 | A | * | 7/1935 | Sefton .......................... 47/57.5 |
| 2,030,052 | A | * | 2/1936 | Bernitz, Sr. .................. 43/108 |
| 2,044,063 | A | * | 6/1936 | Dahlberg ...................... 47/57.5 |
| 2,105,466 | A | * | 1/1938 | Beck et al. ................... 118/50 |
| 2,109,467 | A | * | 3/1938 | Clapshaw ..................... 118/50 |
| 2,186,118 | A | * | 1/1940 | Madison ....................... 118/50 |
| 2,217,557 | A | * | 10/1940 | Macfee ........................ 43/108 |
| 2,240,766 | A | * | 5/1941 | Elder ........................... 43/108 |
| 2,261,454 | A | * | 11/1941 | Scheu ........................... 43/108 |
| 2,297,273 | A | * | 9/1942 | Wolman ....................... 427/291 |
| D162,243 | S | * | 2/1951 | Simmons ..................... 47/32.4 |
| 2,662,342 | A | * | 12/1953 | Peterson ....................... 47/73 |
| 2,701,659 | A | * | 2/1955 | Baltosser ..................... 220/804 |
| 2,746,201 | A | * | 5/1956 | Warrell ........................ 43/108 |
| 2,782,561 | A | * | 2/1957 | Smith ........................... 47/21.1 |
| 2,784,528 | A | * | 3/1957 | Rudenauer ................... 47/48.5 |
| 2,909,328 | A | * | 10/1959 | Babyak ........................ 47/48.5 |
| 2,928,633 | A | * | 3/1960 | Holmes et al. ............... 47/40.5 |
| 2,947,111 | A | * | 8/1960 | Zobrist ......................... 47/57.5 |
| 3,029,558 | A | | 4/1962 | Odenkirk |
| 3,295,254 | A | * | 1/1967 | Schoonman ................. 47/57.5 |
| 3,315,752 | A | * | 4/1967 | Pasquini ....................... 47/33 |
| 3,396,488 | A | * | 8/1968 | Ries .............................. 47/33 |
| 3,415,013 | A | * | 12/1968 | Galbraith ...................... 47/73 |
| 3,443,881 | A | * | 5/1969 | Hudson ........................ 427/291 |
| 3,576,276 | A | * | 4/1971 | Clarke et al. ................. 47/57.5 |
| 3,582,260 | A | * | 6/1971 | Gersonde et al. ............. 118/50 |
| 3,826,040 | A | * | 7/1974 | Roberts et al. ............... 47/32.4 |
| 3,832,803 | A | * | 9/1974 | Blake et al. .................. 47/57.5 |
| 3,920,393 | A | * | 11/1975 | Baynes et al. ................ 47/57.5 |
| 3,951,294 | A | * | 4/1976 | Wilson ......................... 47/33 |
| 3,991,516 | A | * | 11/1976 | Cicero .......................... 47/87 |
| 4,019,279 | A | * | 4/1977 | Moorman et al. ............ 47/32.8 |
| 4,087,938 | A | * | 5/1978 | Koch ............................ 47/48.5 |
| 4,090,326 | A | * | 5/1978 | Crowson et al. ............. 47/57.5 |
| 4,090,328 | A | | 5/1978 | Enos, Jr. |
| 4,098,018 | A | * | 7/1978 | Bartelme ...................... 43/108 |
| 4,144,673 | A | * | 3/1979 | Quast et al. .................. 47/57.5 |
| 4,216,622 | A | * | 8/1980 | Hollenbach et al. .......... 47/71 |
| 4,251,950 | A | * | 2/1981 | Farque et al. ................. 47/1.01 R |
| 4,268,992 | A | * | 5/1981 | Scharf, Sr. .................... 47/32.4 |
| 4,325,202 | A | * | 4/1982 | Liard ............................ 47/73 |
| 4,341,039 | A | * | 7/1982 | Reese ........................... 47/32.4 |
| 4,342,176 | A | * | 8/1982 | Wolfe ........................... 47/57.5 |
| 4,400,909 | A | * | 8/1983 | Reese ........................... 43/108 |
| 4,505,067 | A | * | 3/1985 | Gillespie ...................... 47/57.5 |
| 4,625,474 | A | * | 12/1986 | Peacock et al. .............. 43/124 |
| 4,640,044 | A | | 2/1987 | Varnon |
| 4,665,645 | A | * | 5/1987 | Schau et al. .................. 47/48.5 |
| 4,700,507 | A | * | 10/1987 | Allen ........................... 47/32.4 |
| 4,766,695 | A | * | 8/1988 | Harlow ......................... 47/32.5 |
| 4,800,676 | A | * | 1/1989 | Lockwood, Sr. .............. 43/108 |
| 4,825,587 | A | * | 5/1989 | Stancil ......................... 47/40.5 |
| 4,833,818 | A | | 5/1989 | Berta |
| 4,896,454 | A | * | 1/1990 | Cronenwett et al. .......... 47/57.5 |
| 4,901,472 | A | * | 2/1990 | Donohue et al. ............. 47/32.5 |
| 4,945,675 | A | * | 8/1990 | Kendrick ...................... 47/33 |
| 4,986,025 | A | * | 1/1991 | Imperial ....................... 47/21.1 |
| 5,016,389 | A | * | 5/1991 | Odom, Jr. ..................... 47/57.5 |
| 5,020,272 | A | * | 6/1991 | Herrema et al. .............. 47/33 |
| 5,035,078 | A | * | 7/1991 | Kipnees et al. ............... 47/32.5 |
| 5,048,229 | A | * | 9/1991 | Campbell ..................... 47/32.4 |
| 5,088,233 | A | * | 2/1992 | Frankenbery ................. 47/32.5 |
| 5,121,569 | A | * | 6/1992 | Thomas ........................ 47/33 |
| 5,157,868 | A | * | 10/1992 | Munoz ......................... 47/48.5 |
| 5,170,584 | A | * | 12/1992 | Perry ............................ 43/124 |
| 5,239,773 | A | * | 8/1993 | Doolittle, Jr. ................. 47/57.5 |
| 5,301,461 | A | * | 4/1994 | Zwier ........................... 47/33 |
| 5,402,600 | A | * | 4/1995 | Tompkins ..................... 47/42 |
| 5,452,541 | A | * | 9/1995 | DeMaio ........................ 47/32.4 |
| 5,473,837 | A | * | 12/1995 | Skoczylas et al. ............ 47/40.5 |
| 5,502,920 | A | * | 4/1996 | Takaoka ....................... 43/132.1 |
| 5,535,545 | A | * | 7/1996 | Matz ............................ 239/276 |
| 5,566,503 | A | * | 10/1996 | Nickson ........................ 47/48.5 |
| 5,661,925 | A | * | 9/1997 | MacMaster ................... 47/32.4 |
| 5,768,824 | A | * | 6/1998 | Matz ............................ 239/276 |
| 5,775,027 | A | * | 7/1998 | Tisbo et al. ................... 47/33 |
| 5,791,082 | A | * | 8/1998 | Finello ......................... 47/40.5 |
| 5,870,852 | A | * | 2/1999 | Stanley ......................... 43/132.1 |
| 5,937,574 | A | * | 8/1999 | Jacques ........................ 47/40.5 |
| 6,021,599 | A | * | 2/2000 | Matz ............................ 239/276 |
| 6,108,968 | A | * | 8/2000 | Peng ............................ 43/108 |
| 6,138,405 | A | * | 10/2000 | Matz ............................ 47/33 |
| 6,192,622 | B1 | * | 2/2001 | Haj-Yousef .................. 43/132.1 |
| 6,226,933 | B1 | * | 5/2001 | Nelson et al. ................. 43/124 |
| 6,230,435 | B1 | * | 5/2001 | Carman ........................ 43/108 |
| 6,282,835 | B1 | * | 9/2001 | Richtsmeier ................. 47/24.1 |
| 6,336,290 | B1 | * | 1/2002 | Callan .......................... 47/33 |
| 6,367,194 | B1 | * | 4/2002 | Measday et al. ............. 47/32.4 |
| 6,405,480 | B1 | * | 6/2002 | Martin .......................... 47/57.5 |
| 6,418,663 | B1 | * | 7/2002 | Smith ........................... 47/48.5 |
| 6,536,158 | B2 | * | 3/2003 | Rice ............................. 47/32.4 |
| 6,581,325 | B2 | | 6/2003 | Gordon |
| 6,606,818 | B1 | * | 8/2003 | Christmas .................... 43/132.1 |
| 6,688,036 | B1 | * | 2/2004 | Gunn ........................... 43/132.1 |
| 6,705,044 | B2 | * | 3/2004 | Clancey ....................... 47/32.4 |
| 2003/0029079 | A1 | * | 2/2003 | Kleinert ........................ 47/32.4 |
| 2004/0040199 | A1 | * | 3/2004 | Thompson et al. ........... 43/108 |
| 2008/0127548 | A1 | * | 6/2008 | Chen et al. ................... 43/132.1 |

FOREIGN PATENT DOCUMENTS

| | | | |
|---|---|---|---|
| DE | 10326974 B3 | * | 2/2005 |
| JP | 04278042 A | * | 10/1992 |
| JP | 09224541 A | * | 9/1997 |

* cited by examiner

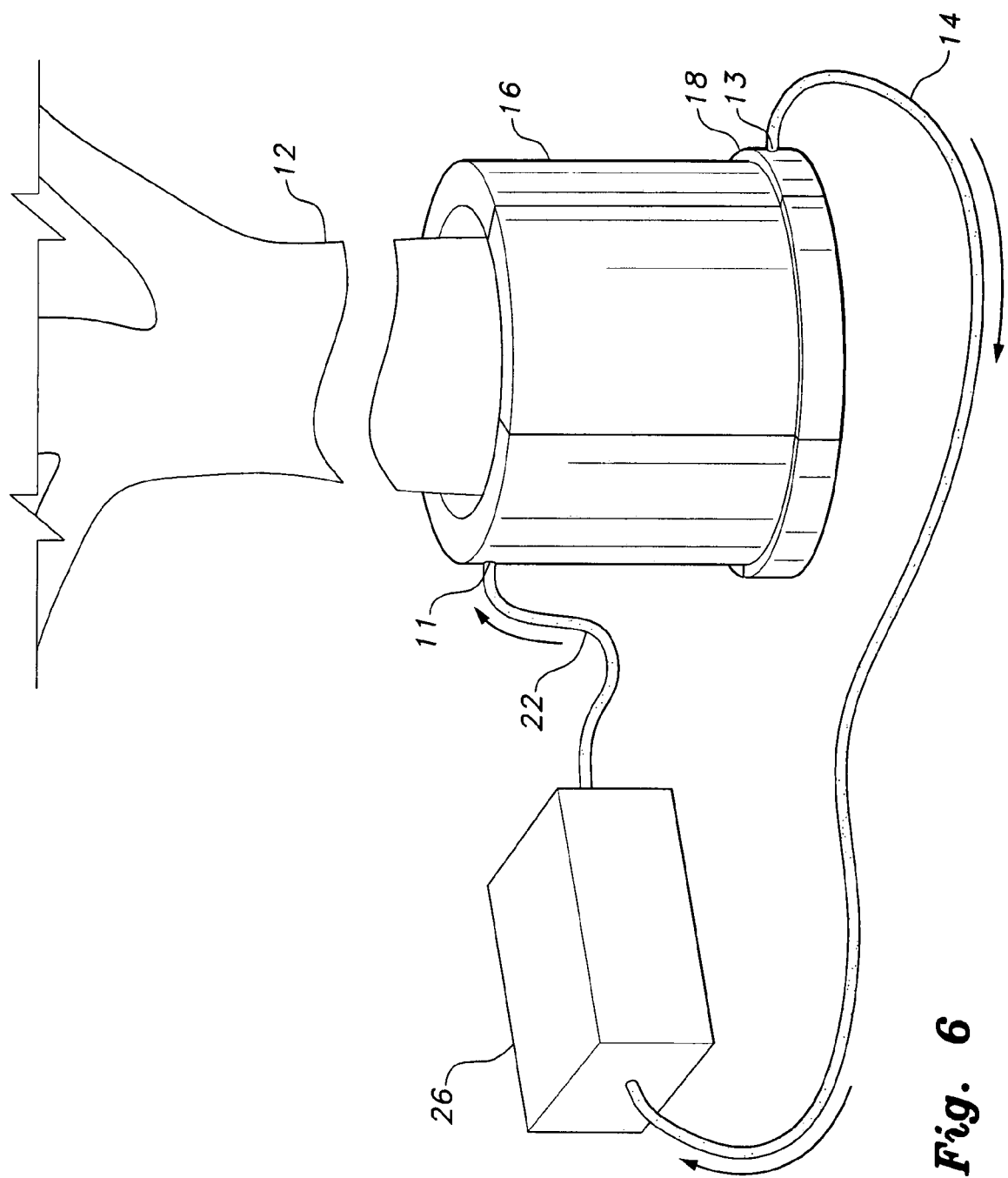

SYSTEM FOR DELIVERY OF INSECTICIDE

BACKGROUND OF THE INVENTION

1. Field of the Invention

The present invention relates pesticide applicators, and particularly to a system for the delivery of insecticide to an insect-infested tree trunk.

2. Description of the Related Art

Insects, such as red palm weevils (*Rhynchophorus ferrugineus*), are the cause of considerable destruction of natural resources, primarily through infestation of trees and plants. When red palm weevils initially infest a tree, the insects dig tunnels into the tree trunk, burrowing into the soft, central portion of the trunk. Once the central portion of the trunk is reached, the insects and their larvae begin ingesting the trunk from the inside, eventually leaving a mostly hollow tree trunk, thus killing the tree.

Superficial spraying of pesticide (i.e., spraying pesticide from a hose or bottle onto the outer face of the tree from a safe distance) is not particularly effective, as the insect larvae and eggs are typically buried deep within the tree trunk. Thus, it is necessary to provide a delivery system that causes the pesticide to penetrate deeply within the central portion of the trunk of the tree. Further, such conventional spraying represents an environmental hazard, in that atomized insecticide may travel to surrounding areas via the wind, and liquid insecticide will seep into the soil surrounding the tree. Many pesticides are also toxic to humans and other animals, thus making it desirable to only apply insecticide directly to the tree and not into the surrounding environment.

Thus, a system for delivery of insecticide solving the aforementioned problems is desired.

SUMMARY OF THE INVENTION

The system for delivery of insecticide provides a portable enclosure for delivering insecticide to an infested tree trunk. The system includes an annular shell disposed around with the trunk of the tree that defines an annular tank. An annular base supports the wall(s) of the annular shell and has a liquid impermeable membrane attached thereto that can be wrapped around the base of the tree trunk to prevent pesticide seepage into the ground. A pump delivers insecticide into the annular tank at an upper end of the tank. A drain hose attached to the base of the tank returns insecticide to the pump for recirculation. The pump is actuated or actuable in pulsating mode to agitate insecticide in the tank, causing waves of sufficient pressure to induce the insecticide to penetrate deeply through any bores in the trunk to kill both adult insects and larva.

The annular shell may have an annular base having a U-shaped groove defined in its upper surface for supporting the shell wall(s). A rubber gasket may be placed on the bottom edge of the shell wall(s) to prevent pesticide leaking out of the bottom of the tank through the groove. The annular base may be made in segments joined together in any suitable matter. The base may have a drain outlet or port for connection of the drain hose to allow return to the pump for recirculation of the insecticide.

The annular shell may have a cylindrical wall made from arcuate segments, with adjoining segments being joined by tongue and groove joints. Alternatively, the annular shell may be polygonal in transverse cross section, having a plurality of flat wall panels joined by elongated connectors forming the angles of the polygon and having grooves along both edges to snap in the edges of the panels. In either case, the wall segments forming the shell are connected by joints that are liquid impermeable to prevent liquid insecticide from leaking out through the wall(s) of the tank.

These and other features of the present invention will become readily apparent upon further review of the following specification and drawings.

BRIEF DESCRIPTION OF THE DRAWINGS

FIG. 6 is an environmental, perspective view of the system for the delivery of insecticide according to the present invention, illustrating the recirculation of insecticide therein.

Similar reference characters denote corresponding features consistently throughout the attached drawings.

DETAILED DESCRIPTION OF THE PREFERRED EMBODIMENTS

Figure 1:
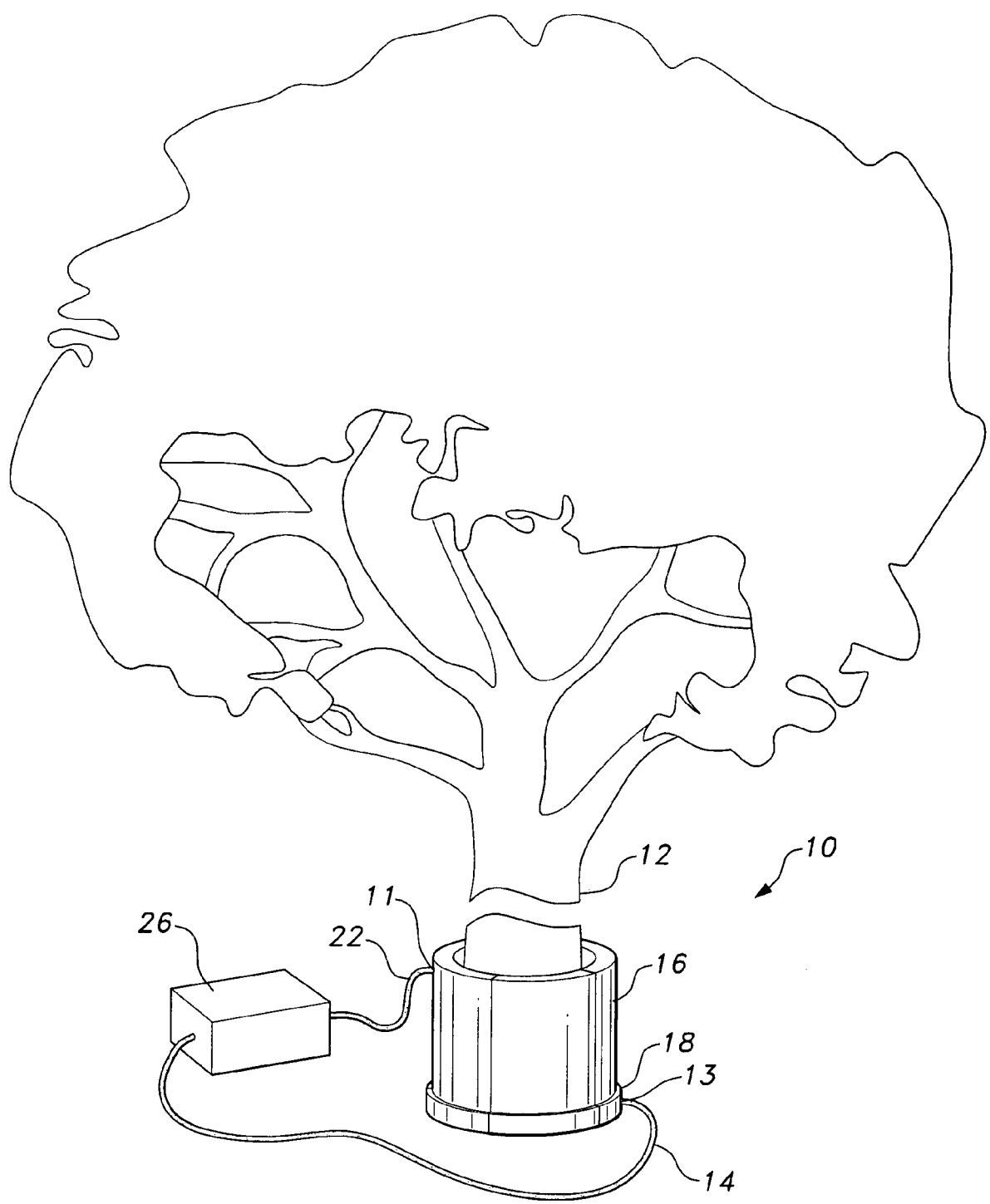
FIG. 1 is an environmental, perspective view of a system for delivery of insecticide according to the present invention.
Figure 5:
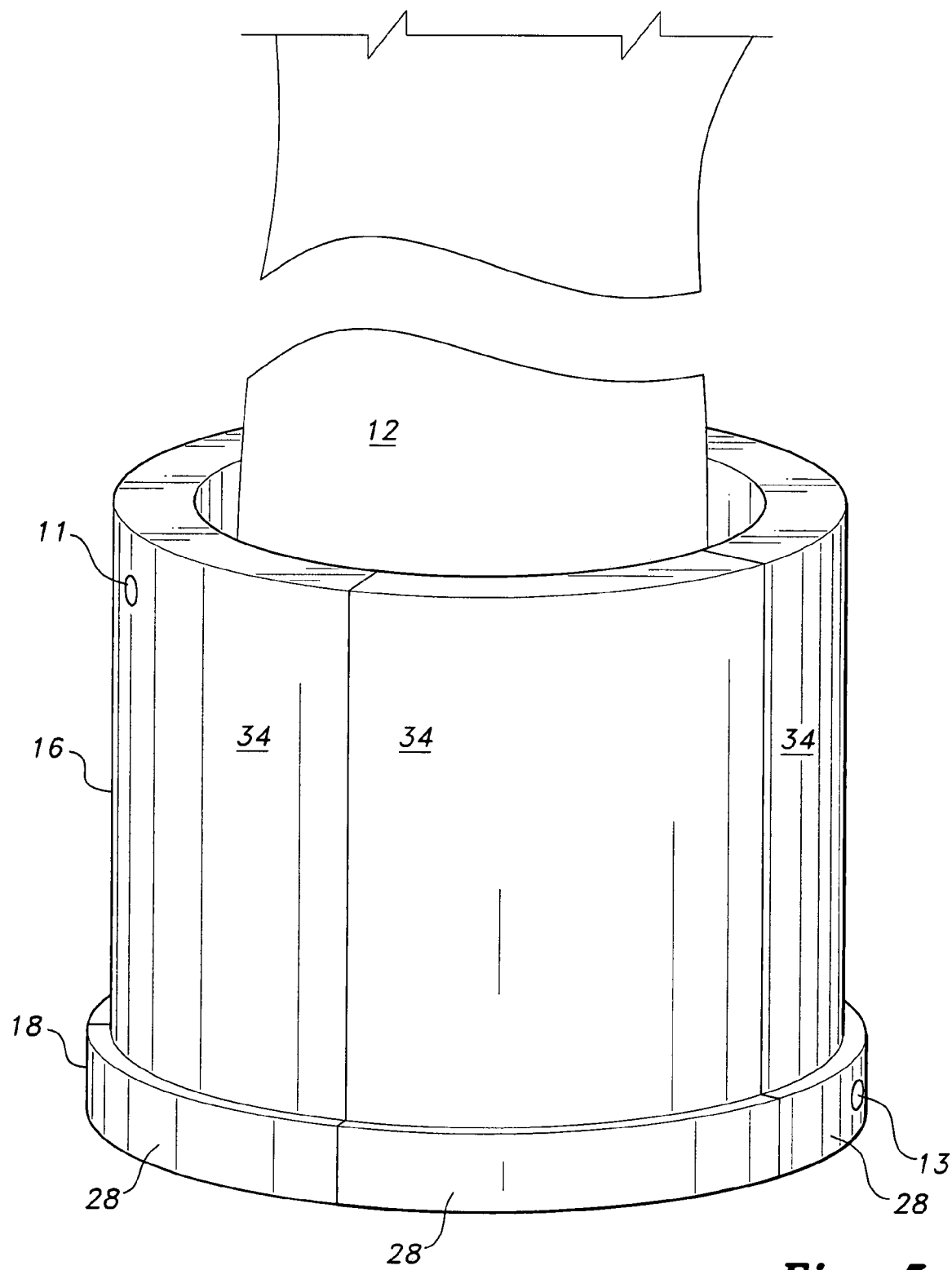
FIG. 5 is an environmental, perspective view of the tank member of the system for the delivery of insecticide according to the present invention.

The present invention is directed towards a system for delivery of insecticide 10. FIG. 1 illustrates system 10 placed about an exemplary tree trunk 12. As will be described in greater detail below, system 10 is preferably portable and includes a plurality of interlocking elements. During transport and storage, these elements are disassembled and, in use, the system 10 is transported to the location of tree 12 and placed around tree 12 (as shown in FIGS. 1 and 5). System 10 provides a portable enclosure or tank for delivering insecticide to an insect-infested tree trunk. Although shown as having a substantially cylindrical contour, it should be understood that the shell 16 may have any shape, e.g., the shell 16 may be polygonal.

As shown in FIGS. 1 and 5, the system 10 includes a shell 16 that defines an annular tank when placed around the trunk of a tree. The shell 16 includes an annular base 18 having a drain port 13 formed therein. Insecticide is introduced into the tank, either through an optional inlet port 11 defined through shell 16, or by a hose or hook draped over the upper edge of the shell 16 into the annular space or cavity formed between the shell 16 and the tree trunk 12.

Figure 2A:
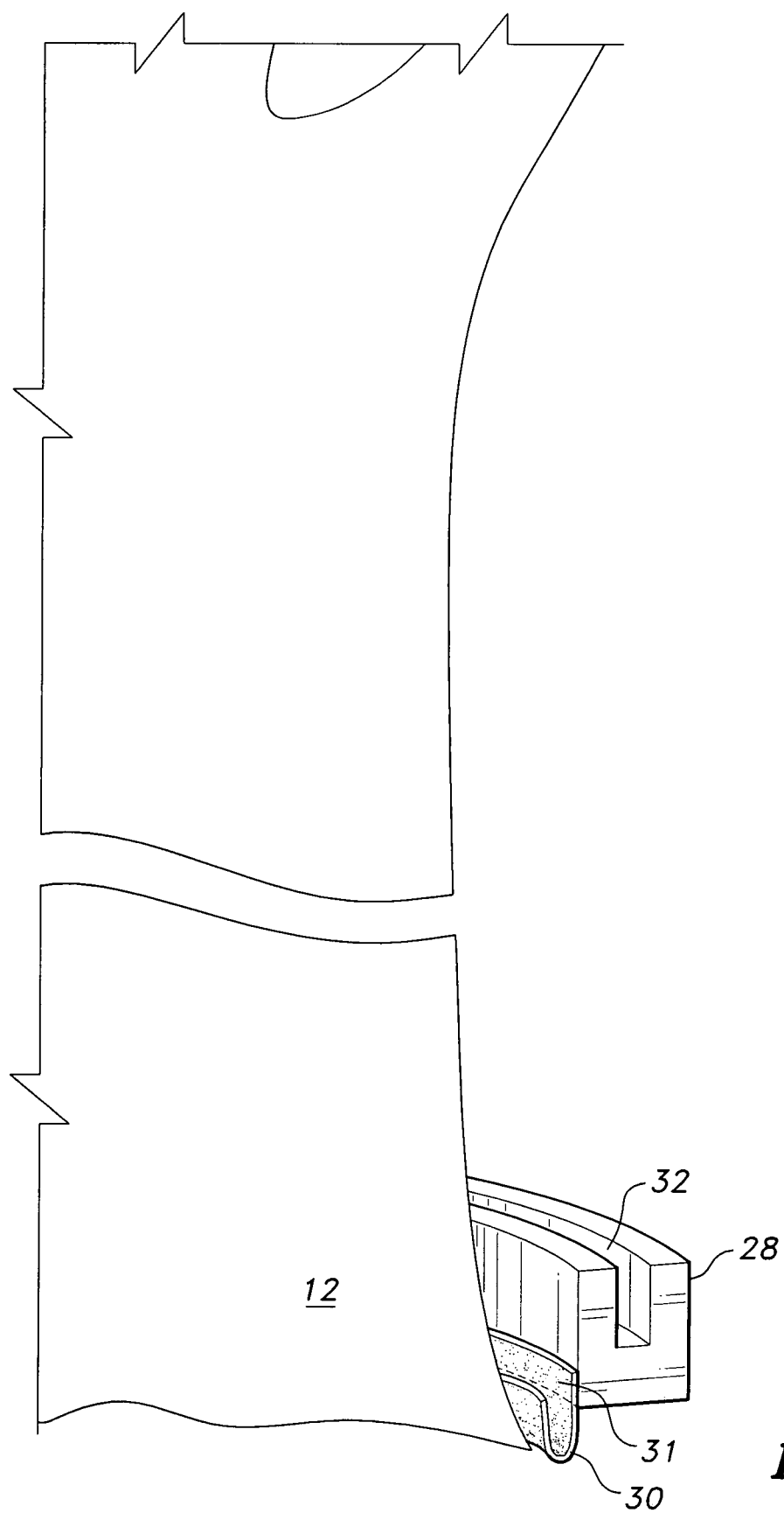
FIG. 2A is an environmental, perspective view of a base member of the system for delivery of insecticide according to the present invention.

As shown in FIG. 2A, the upper end of the annular base preferably has an annular U-shaped groove 32 formed in its upper edge for receiving the lower edge of the wall(s) forming shell 16. FIG. 2A illustrates a single base member 28, with a plurality of base members 28 preferably forming annular base 18.

A pump 26 delivers insecticide through the inlet port 11 (or over the top edge of the shell 16) via hose 22, and removes the insecticide through drain port 13 formed in the annular base via hose 14. Hoses 22, 14 may be any suitable fluid conduit, preferably a flexible fluid conduit. The pump 26 may be any suitable type of fluid pump. Preferably, the pump 26 may provide oscillatory pulsed pumping, with the intensity and duration of the insecticide delivery pulses being user-controllable. The insecticide is preferably recirculated (as shown by the directional arrows in FIG. 6), under user control, through the pump 26. In operation, the user fills shell 16 with insecticide, and then actuates the oscillatory pulsations of the insecticide, which forces the pesticide into the tunnels bored by the insects.

Figure 3:
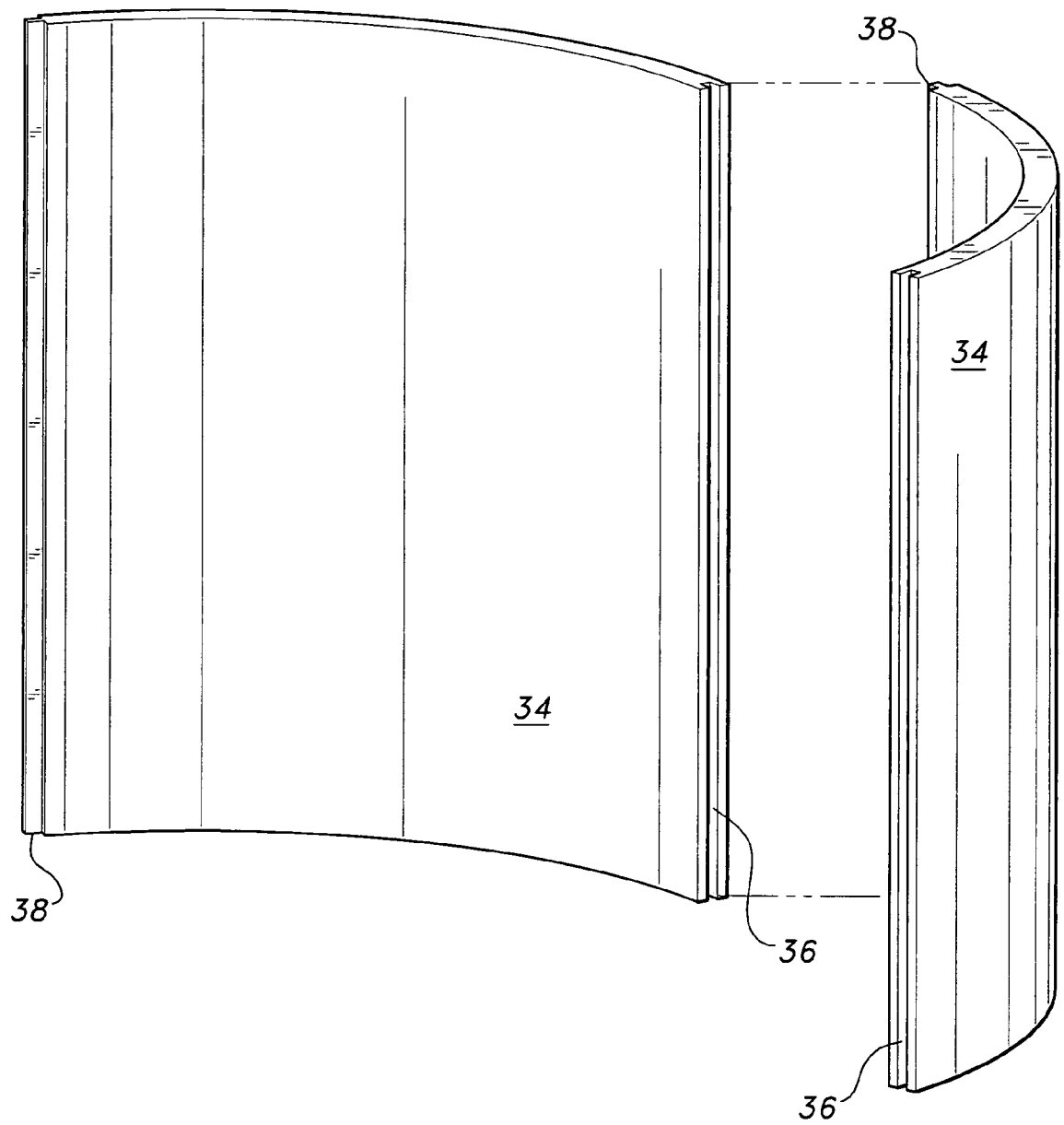
FIG. 3 is a perspective view of a pair of shell members of the system for the delivery of insecticide according to the present invention.

The shell 16 is formed from a plurality of wall members 34, as best shown in FIG. 3. Adjacent wall members 34 are joined together by tongue-and-groove joints, with each wall member 34 having a groove 36 formed along one edge and a tongue 38 formed along the opposite edge. The joints may be formed by snapping the tongue 38 of one member 34 into the groove 36 of the adjoining member 34 (or by sliding the tongue 38 into the groove 38) to form a liquid impermeable joint.

Similarly, the annular base 18 is preferably formed from a plurality of base member segments 28. The base member segments 28 may be held in an annular pattern by insertion of wall members 34 into U-shaped grooves 32, or may be positively joined by suitable fasteners, e.g., tabs, clips, dowels, etc.

Figure 2B:
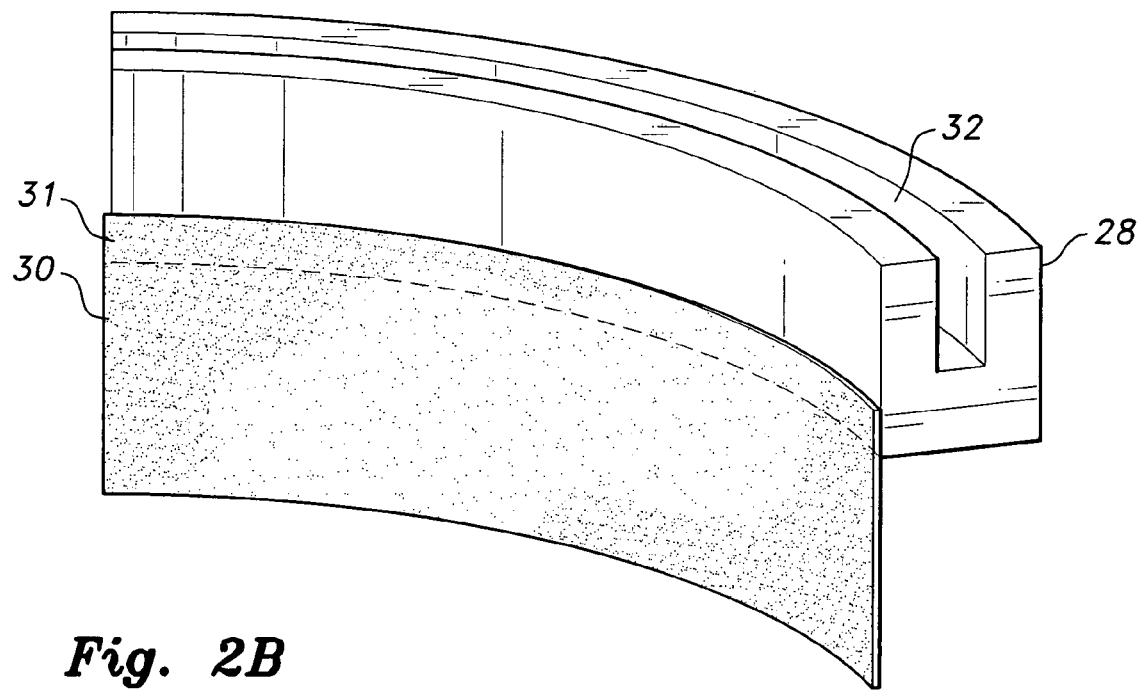
FIG. 2B is a perspective view of the base member with an attached fluid-permeable membrane of the system for delivery of insecticide according to the present invention.
Figure 2C:
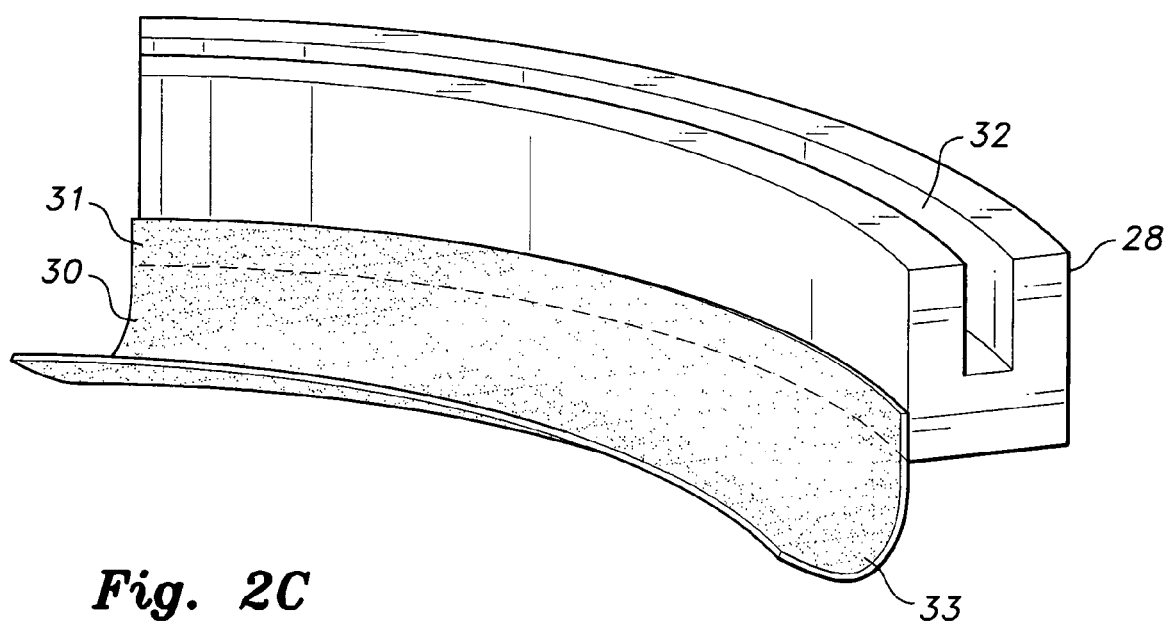
FIG. 2C is a perspective view of the base member of FIG. 2B with the fluid-impermeable membrane folded to form a fluid-collecting recess.

As shown in FIGS. 2A-2C, a fluid impermeable membrane 30 is attached to an interior surface of the annular base 16 at upper edge 31 of the membrane 30. As shown in FIG. 2C, the fluid impermeable membrane 30 is wrapped around the trunk of the tree 12 and folded to form a fluid collecting recess 33 at the bottom of the tank, thus preventing the insecticide from contaminating the ground.

Figure 4:
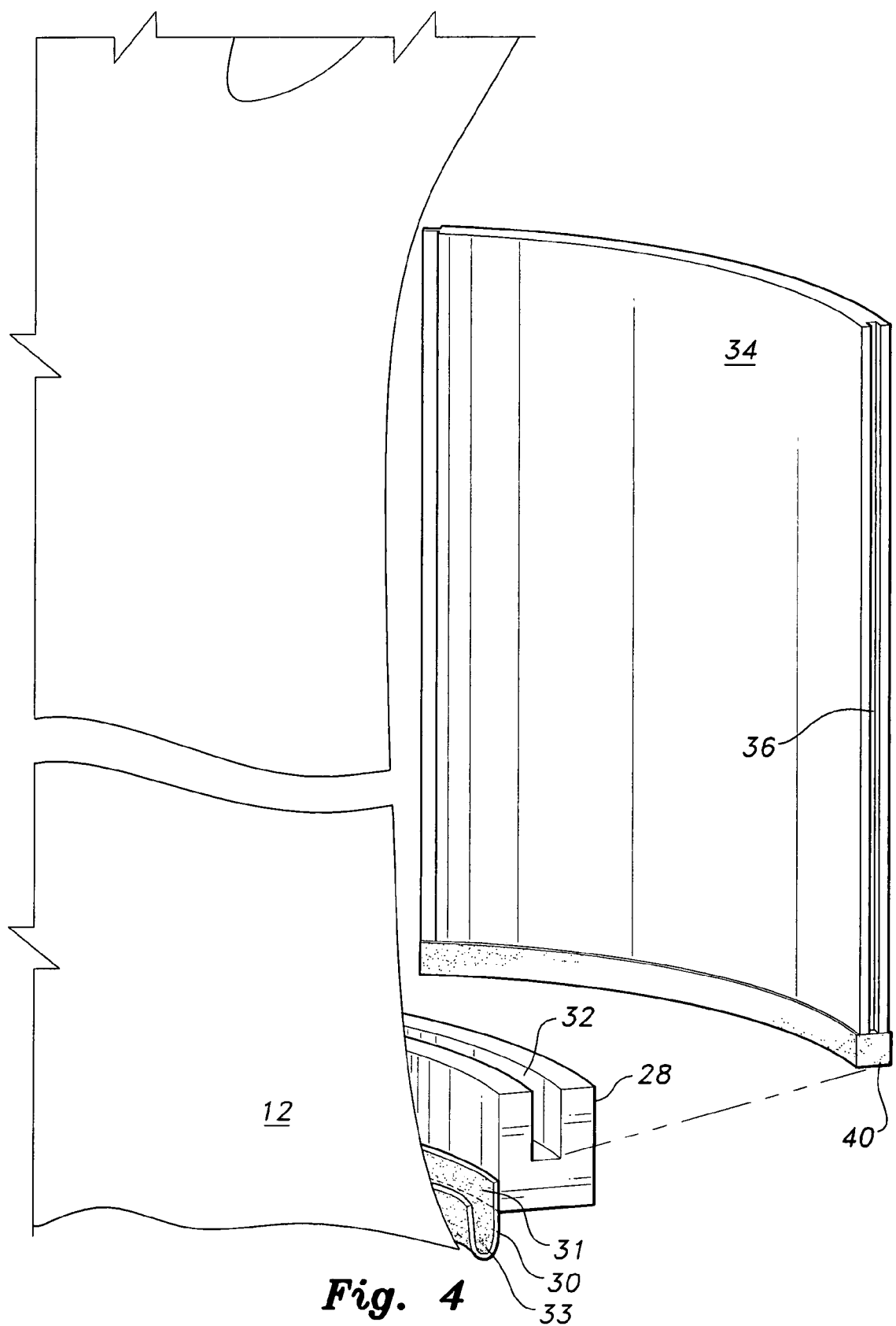
FIG. 4 is an exploded environmental, perspective view of the base member of FIG. 2B and one of the shell members of FIG. 3.

As shown in FIG. 4, a rubber gasket 40 or other suitable seal may be inserted into the groove 32 between wall members 34 and base 18 for enhancing the frictional engagement between the shell member 34 and corresponding base member 28, and for further providing a fluid-tight seal therebetween.

It is to be understood that the present invention is not limited to the embodiments described above, but encompasses any and all embodiments within the scope of the following claims.

We claim:

1. A system for the delivery of insecticide, comprising:
a shell adapted for placement around a trunk of a tree, the shell defining an annular tank, the shell having a segmented annular base comprising a plurality of base member segments and a plurality of shell wall members supported on the base, the base having a drain port defined therein, wherein each of said shell wall members has an elongated tongue extending along a first edge thereof and an elongated groove extending along an opposite second edge thereof, said shell wall members being joined together by tongue-and-groove joints formed when said tongues are snapped into said grooves, wherein each of the segments of said annular base has a top edge and an elongated groove defined in the top edge, said shell wall members being seated in the grooves formed in the top edges of the base member segments, and wherein each of the segments of said annular base has a lower edge attached to an upper edge of a fluid impermeable membrane, the membrane being adapted for wrapping around the tree trunk to form a fluid collecting recess in order to prevent the insecticide from penetrating ground surrounding the tree trunk;
a rubber gasket disposed both in the elongated grooves defined in the top edges of the segments and between the shell wall members and the base member segments, the gasket forming a fluid-tight seal; and
a pump having a first fluid conduit connected to the drain port and a second fluid conduit adapted for pumping a liquid insecticide into a top end of the annular tank, the pump being operable in an oscillating pulsed mode for causing the insecticide to penetrate bores in the tree formed by insect pests, the pump recirculating insecticide through the annular tank at a user-selectable frequency.

2. The system for the delivery of insecticide as recited in claim 1, wherein said shell is cylindrical.

3. The system for the delivery of insecticide as recited in claim 1, wherein said plurality of shell wall members are joined together by said tongue-and-groove joints which comprise liquid impermeable joints.

4. The system for the delivery of insecticide as recited in claim 1, wherein said first and second fluid conduits comprise flexible hoses.

5. The system for the delivery of insecticide as recited in claim 1, further comprising an inlet port formed in one of said shell wall members, said second fluid conduit being connected to the inlet port.

6. A system for the delivery of insecticide, comprising:
a shell adapted for placement around a trunk of a tree, the shell defining an annular tank, the shell having a segmented annular base comprising a plurality of base member segments and a plurality of shell wall members supported on the base, the base having a drain port defined therein, wherein each of said shell wall members has an elongated tongue extending along a first edge thereof and an elongated groove extending along an opposite second edge thereof, said shell wall members being joined together by tongue-and-groove joints formed when said tongues are snapped into said grooves, wherein each of the segments of said annular base has a top edge and an elongated groove defined in the top edge, said shell wall members being seated in the grooves formed in the top edges of the base member segments, and wherein each of the segments of said annular base has a lower edge attached to an upper edge of a fluid impermeable membrane, the membrane being adapted for wrapping around the tree trunk to form a fluid collecting recess in order to prevent the insecticide from penetrating ground surrounding the tree trunk;
a rubber gasket disposed both in the elongated grooves defined in the top edges of the segments and between the shell wall members and the base member segments, the gasket forming a fluid-tight seal; and
means for recirculating a liquid insecticide through a tank in pulsed waves for penetrating bores formed in the tree trunk by pestiferous insects, wherein said means for recirculating comprises a pump, a first fluid conduit connected between the pump and the drain port, and a second fluid conduit connected to the pump, the second fluid conduit being adapted for delivering the liquid insecticide to an upper end of the tank.

7. The system for the delivery of insecticide according to claim 6, wherein said first and second fluid conduits comprise flexible hoses.

8. The system for the delivery of insecticide according to claim 6, wherein said shell has a fluid inlet port formed in an upper end thereof, said second fluid conduit being connected to the fluid inlet port.

9. The system for the delivery of insecticide according to claim 6, wherein said shell is cylindrical.

10. A method for delivering insecticide, comprising the steps of:

providing a system for delivery of insecticide, the system comprising:

a shell adapted for placement around a trunk of a tree, the shell defining an annular tank, the shell having a segmented annular base comprising a plurality of base member segments and a plurality of shell wall members supported on the base, the base having a drain port defined therein, wherein each of said shell wall members has an elongated tongue extending along a first edge thereof and an elongated groove extending along an opposite second edge thereof, said shell wall members being joined together by tongue-and-groove joints formed when said tongues are snapped into said grooves, wherein each of the segments of said annular base has a top edge and an elongated groove defined in the top edge, said shell wall members being seated in the grooves formed in the top edges of the base member segments, and wherein each of the segments of said annular base has a lower edge attached to an upper edge of a fluid impermeable membrane, the membrane being adapted for wrapping around the tree trunk to form a fluid collecting recess in order to prevent the insecticide from penetrating ground surrounding the tree trunk;

a rubber gasket disposed both in the elongated grooves defined in the top edges of the segments and between the shell wall members and the annular base segments, the gasket forming a fluid-tight seal; and a pump having a first fluid conduit connected to the drain port and a second fluid conduit adapted for pumping a liquid insecticide into a top end of the annular tank, the pump being operable in an oscillating pulsed mode for causing the insecticide to penetrate bores in the tree formed by insect pests, the pump recirculating insecticide through the annular tank at a user-selectable frequency;

placing the annular tank around a trunk of a tree; and recirculating the liquid insecticide through the tank in pulsed waves so that the insecticide penetrates bores in the tree formed by pestiferous insects.

* * * * *